UNITED STATES PATENT OFFICE.

GUSTAV SPIESS AND ADOLF FELDT, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DOUBLE SALTS OF GOLD HYDROCYANIC ACIDS AND PROCESS OF MAKING SAME.

1,115,608.  Specification of Letters Patent.  Patented Nov. 3, 1914.

No Drawing.  Application filed January 16, 1914. Serial No. 812,575.

*To all whom it may concern:*

Be it known that we, GUSTAV SPIESS, Ph. D., professor of medicine, and ADOLF FELDT, Ph. D., doctor of medicine, citizens of the Empires of Germany and Russia, respectively, residing at Frankfort-on-the-Main, Germany, have invented certain new and useful Improvements in Double Salts of Gold Hydrocyanic Acids and Processes of Making Same, of which the following is a specification.

It is known that the complex gold-hydrocyanic acids and their salts possess a strong destructive action upon microörganisms and consequently, when introduced into the animal body, they have a great curative effect. Now we have found that the disinfecting power of said acids in the animal organism is greatly increased by protecting the said unstable complex gold-hydrocyanic acids from an immediate reduction, which protection can be effected by forming double-salts with organic nitrogenous bases, which salts are obtained by treating the bases or their salts with a gold-hydrocyanic acid or its salt. The products thus obtained most probably correspond to the general formula:

$$BN\text{---}HCN.AuCN$$

wherein BN stands for an organic nitrogenous base, and HCN.AuCN for a complex gold-hydrocyanic acid. They are colorless to yellow crystals, which dissolve in water without decomposition and which are scarcely soluble in ether and benzine and, on heating, decompose, leaving metallic gold.

The following examples illustrate our invention:

Example I: 4.5 grams of the hydrocholrid of 1-phenyl-2.3-dimethyl-4-amino-5-pyrazolone, dissolved in 25 cc. of water, are added to a solution of 7 grams of potassium auricyanid which are also dissolved in 25 cc. of water. After a short time, the double-salt separates as crystals forming faint yellowish-brown laminæ, melting at 196–198° C. They dissolve in water in the proportion of 1:120. They contain 39.19 per cent. of gold (theoretically calculated 39.01 per cent.). 

Example II: 5 grams of the hydrochlorid of 1-phenyl-2.3-dimethyl-4-dimethylamino-5-pyrazolone are dissolved in 25 cc. of water and there is added a solution of 7 grams of potassium auricyanid dissolved in 25 cc. of water. The double-salt separates at once as crystals forming small colorless laminæ, melting at 183–185° C. In cold water the salt is scarcely soluble and it contains a percentage of gold corresponding to the formula:

$$C_{13}H_{17}ON_3.HCN.Au(CN)_3.$$

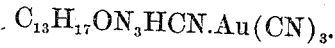

Example III: 5 grams of potassium aurocyanid are well stirred with 10 cc. of water and 3 grams of cholin-hydrochlorid are added, whereupon complete solution occurs. After having allowed this solution to stand for 24 hours, the resulting potassium chlorid is precipitated with absolute alcohol and the alcoholic filtrate is evaporated *in vacuo*. The remaining crystalline mass is pressed out upon a clay-plate and dried over concentrated sulfuric acid. The cholin-aurocyanid melts at 80–83° C.; it is very readily soluble in water. The percentage of gold contained therein corresponds to the formula:

$$HOCH_2N(CH_3)_3CN,AuCN.$$

Example IV: 4 grams of piperazin hydrochlorid are dissolved in 50 cc. of water and there is added a solution of 9 grams of potassium aurocyanid in 100 cc. of water. The auric double-salt separates at once in the form of long needles of a faint pink color. These needles are filtered off and washed with cold water. The piperazin aurocyanid $$C_4H_{10}N_2.2HCN,AuCN$$

begins to sinter at about 240° C. and melts at 252–255° C. It is rather difficultly soluble in water. The percentage of gold found to be contained therein is 67.29 (theoretically calculated 67.24).

Having now described our invention, what we claim is:

1. The process of preparing double-salts of gold-hydrocyanic acids with organic nitrogenous bases, which consists in treating the respective organic bases with auro-hydrocyanic acid.

2. As new products, gold hydrocyanids of organic-nitrogenous bases which correspond to the formula:

BN—HCN.AuCN wherein BN stands for an organic nitrogenous base, and HCN.AuCN for a complex gold-hydrocyanic acid, being colorless to yellow crystals, which dissolve in water without decomposition, and which are scarcely soluble in ether and benzene and, when heated, decompose, leaving metallic gold.

3. As a new product, the aurihydrocyanid of 1-phenyl-2.3-dimethyl-4-dimethylamino-5-pyrazolone of the constitution:

$C_{13}H_{17}ON_3HCN,Au(CN)_3$ being colorless laminæ, melting at 183–185° C., slightly soluble in cold water, scarcely soluble in ether and benzene and decomposing, when heated, leaving metallic gold.

In testimony whereof, we affix our signatures in presence of two witnesses.

GUSTAV SPIESS.
ADOLF FELDT.

Witnesses:
JEAN GRUND,
CARL GRUND.